United States Patent
Rubino, Jr.

(10) Patent No.: US 6,757,464 B2
(45) Date of Patent: Jun. 29, 2004

(54) USE OF SOL-GEL AS INORGANIC ADHESIVE FOR HIGH STABILITY, HERMETIC BONDING OF OPTICAL FIBER TO AN ALIGNMENT PLATE

(75) Inventor: Robert A. Rubino, Jr., Tolland, CT (US)

(73) Assignee: Schott Corporation, Yonkers, NY (US)

( * ) Notice: Subject to any disclaimer, the term of this patent is extended or adjusted under 35 U.S.C. 154(b) by 231 days.

(21) Appl. No.: 10/135,257

(22) Filed: Apr. 30, 2002

(65) Prior Publication Data

US 2002/0176668 A1 Nov. 28, 2002

Related U.S. Application Data

(60) Provisional application No. 60/287,606, filed on Apr. 30, 2001.

(51) Int. Cl.$^7$ .............................. G02B 6/26; G02B 6/42
(52) U.S. Cl. .......................... 385/52; 385/115; 385/114
(58) Field of Search .................... 385/52, 114, 115–121

(56) References Cited

U.S. PATENT DOCUMENTS

| | | |
|---|---|---|
| 3,713,729 A | 1/1973 | Inoue et al. |
| 4,611,378 A | 9/1986 | Caserta et al. |
| 5,135,590 A | 8/1992 | Basavanhally et al. |
| 5,185,846 A | 2/1993 | Basavanhally et al. |
| 5,208,890 A | 5/1993 | Kohler et al. |
| 5,345,529 A | 9/1994 | Sizer, II et al. |
| 5,653,777 A | 8/1997 | Semerdjian |
| 5,689,599 A | 11/1997 | Shahid |
| 5,707,548 A | 1/1998 | King et al. |
| 5,822,072 A | 10/1998 | Dai et al. |
| 5,841,545 A | 11/1998 | Young |
| 5,991,493 A | 11/1999 | Dawes et al. |
| 6,243,518 B1 | 6/2001 | Lee et al. |
| 6,493,489 B2 * | 12/2002 | Mertz et al. .................. 385/52 |

* cited by examiner

Primary Examiner—Thien M. Le
Assistant Examiner—Edwyn Labaze
(74) Attorney, Agent, or Firm—Volpe and Koenig, P.C.

(57) ABSTRACT

A fiber optic assembly including an alignment plate having an M×N array of alignment holes formed thereon and an equal number of optical fibers, each bonded to a respective one of the alignment holes. A bondline, preferably an inorganic adhesive having a glass transition temperature of at least about 150° C., is located between each optical fiber and its respective alignment hole. The bondline is preferably less than about 200 nm in thickness. The inorganic adhesive is preferably formed from a colloidal suspension of sodium silicate.

15 Claims, 1 Drawing Sheet

Figure 1:
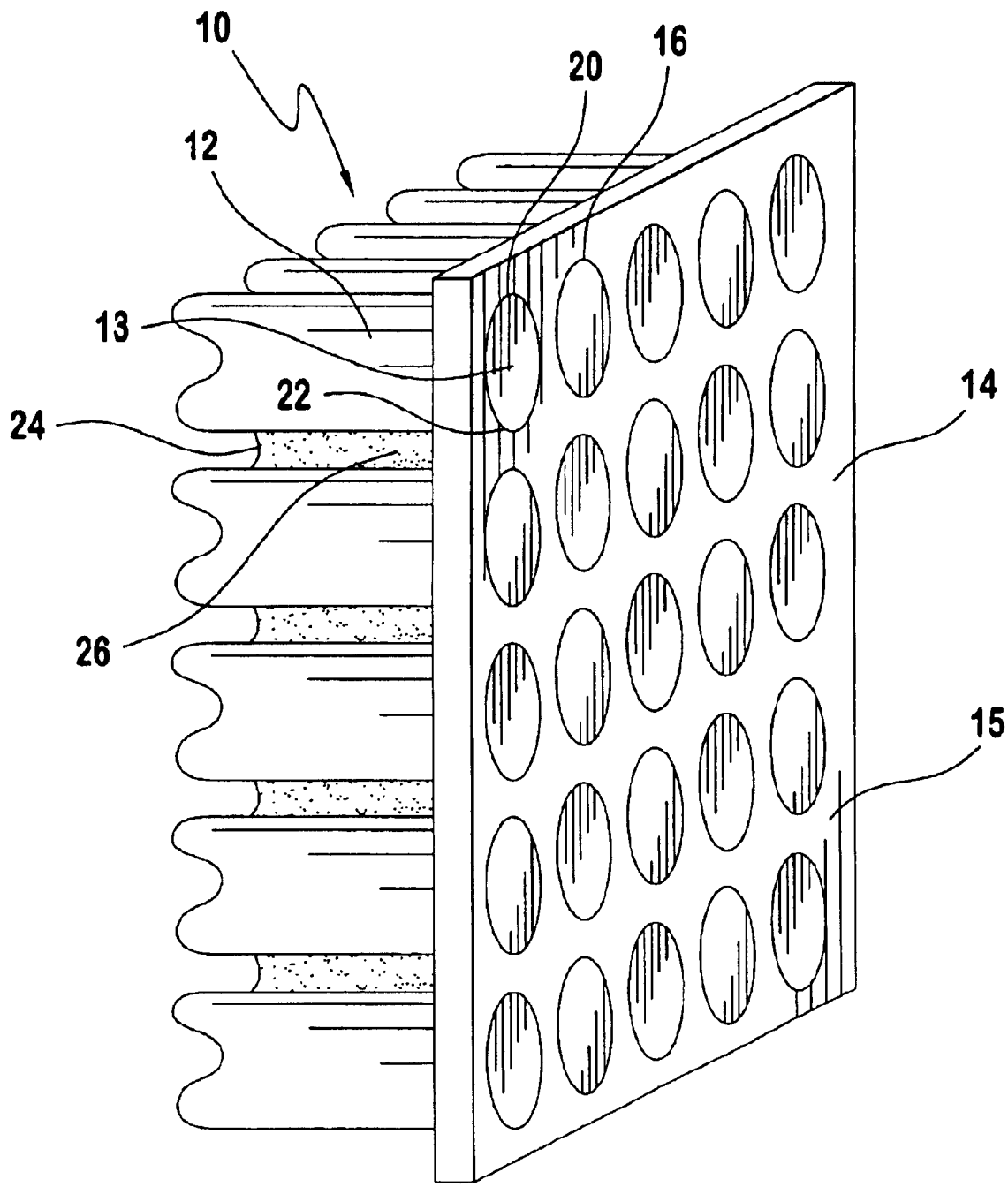

USE OF SOL-GEL AS INORGANIC ADHESIVE FOR HIGH STABILITY, HERMETIC BONDING OF OPTICAL FIBER TO AN ALIGNMENT PLATE

CROSS-REFERENCE TO RELATED APPLICATIONS

This application claims the benefit of U.S. Provisional Application No. 60/287,606, filed Apr. 30, 2001.

BACKGROUND

This invention pertains to the bonding of optical fibers to M×N perforated alignment plates and to methods of making such assemblies into high density optical connectors and optical fanouts.

The bonding of optical fibers into alignment plates fabricated of silicon, silica and other materials is well known. However, the adhesive used in these applications, in particularly for high dimensional precision bonding required of signal-mode optical fiber applications, is typically an organic adhesive generically referred to as an "epoxy."

Epoxies have many advantages for the bonding of dissimilar materials, not the least of which is their low viscosity (important for high dimensional precision, i.e. thin bond line), strength, toughness and ease of application. However, irrespective of cure technique (UV, thermal, etc.), epoxies have modest glass transition temperatures ($T_g$) in which their mechanical properties are better described as visco-fluidic rather than solid. Unfortunately, the transition between fluidic and solid is more or less a continuum in which the onset of undesirable visco-elastic characteristics of the epoxy can occur at temperatures significantly below that of the $T_g$.

In the field of high precision bonding of optical fiber, these undesirable visco-elastic characteristics of epoxy can significantly increase the risk of system failure due to fiber misalignment. The high thermal coefficient of expansion (TCE) of epoxies, in particular for temperatures approaching the $T_g$ (typically ~125° C.) whereby the TCE in general increases threefold, can cause mechanical reliability concerns of the optical fiber itself.

For these reasons of performance in mechanical reliability, including a lack of hermeticity to the ingress of water through the bondline, the telecommunications industry has experimented with the variety of alternative bonding technologies including glass-to-metal sealing with limited success.

To date, however, a bonding technology that does not exhibit the deleterious effects of visco-elastic creep and non-linear TCE associated with epoxies and the cost and difficulty encountered with glass-to-metal seals, has not yet been found. There is a need to find a method to connect optical fibers into alignment plates which will allow high dimensional precision bonding for single-mode optical fiber applications.

SUMMARY

In one respect, the invention comprises a fiber optic assembly including an alignment plate having at least one alignment hole formed thereon and at least one optical fiber. The optical fibers are smaller in diameter than the holes. The each optical fiber is inserted into a respective one of the alignment holes. A bondline is located between each optical fiber and its respective alignment hole. The bondline preferably comprises an inorganic adhesive having a glass transition temperature of at least about 150° C.

In another respect, the invention comprises a fiber optic assembly including an alignment plate having at least one alignment hole formed thereon and at least one optical fiber. The optical fibers are preferably smaller in diameter than the holes. Each optical fiber is inserted into a respective one the alignment holes and is bonded thereto along a bondline. The bondline is preferably less than about 200 nm in thickness and comprises a sol-gel having a glass transition temperature of at least about 150° C.

In yet another respect, the invention comprises a fiber optic assembly including a plurality of optical fibers bonded to a plurality of holes formed in an alignment plate along a plurality of bondlines by an inorganic adhesive. The bondlines correspond to lines of contact between each of the optical fibers and a respective one holes formed in the alignment plate. The inorganic adhesive is preferably formed from a colloidal suspension of sodium silicate.

BRIEF DESCRIPTION OF THE DRAWING(S)

The foregoing summary, as well as the following detailed description of the preferred embodiments of the invention, would be better understood when read in conjunction with the appended drawing. For the purpose of illustrating the invention, a preferred embodiment of the invention is shown. It is understood, however, that the invention is not limited to the precise of arrangement and instrumentality shown.

FIG. 1 is a side perspective view of a system using a sol-gel bond to connect optical fibers to an alignment plate.

DETAILED DESCRIPTION OF THE PREFERRED EMBODIMENT(S)

Referring to FIG. 1 a sol-gel attached fiber array system 10 in accordance with the present invention is shown. Individual optic fibers 12 having planar faces 13 are arranged in an M×N array and held in position by an alignment plate 14 having a planar front face 15. Holes 16 are preferably cylindrical in shape and precisely located in the alignment plate 14 such that optic fibers 12 may be inserted into the alignment plate 14 for eventual connection to other optical devices. However, those skilled in the art will recognize, that the holes 16 may have other shapes. Generally, the holes have a larger diameter than the optical fibers 12 and preferably are about 1% larger, although those skilled in the art will recognize that the relative diameter of the holes 16 may be varied to produce a larger or smaller sol-gel bondline 22.

As will be described in greater detail herein, a sol-gel 20 is applied between the optical fibers 12 and the alignment plate 14 and dried to form a sol-gel bondline 16 for the system. The sol-gel 20 is dried and heat treated to activate chemical bonds between the optical fibers 12 and the alignment plate 14 and cured to produce a dense preferably, hermetic bond.

Although shown as an orthogonal connection between the attached optical fibers 12 and the face 15 of the alignment plate 14, those skilled in the art will recognize that the connection between the optic fibers 12 and the alignment plate 14 may be at any angle or shape according to the shape and orientation of the holes 16 of the alignment plate 14.

The formation of the assembly 10 will now be discussed in detail. Before bonding, the bonding surfaces of the optical fibers 12 and the holes 16 are preferably cleaned with a cleaning agent, such as methanol, then "activated" using any suitable technique known in the art, such as wet chemistry, plasma, or flame activation. Application of an activation solution of three (3) molal potassium hydroxide is the preferred technique because it minimizes the risk of damage to the optical fibers 12. The optical fibers 12 are then inserted into a respective one of the holes 16, using any suitable placement method.

Once the optical fibers 12 are in place, the sol-gel solution is then introduced onto the faces 13 of the fibers, or directly on the bondlines 22, using a precision micro-dispenser. Any suitable sol-gel formulation can be used. For example, a solution of sodium silicate, containing about 14% NaoH and 27% $SiO_2$ and de-ionized water has been found to work well in this application. The preferred concentration of sodium silicate in the sol-gel 20 is 3–14% (by weight), although concentrations of 45% are suitable. Concentrations above 45% sodium silicate require special process steps to avoid precipitation of the suspension.

In the interest of clarity, only one optical fiber 12 and its associated hole 16 and bondline 22 are labeled in FIG. 1. It should be understood that the features described with respect to the optical fibers 12 labeled in FIG. 1 apply to all twenty-five (25) of the optical fibers 12.

The sol-gel is 20 then cured using any suitable method including but not limited to, thermal or laser curing. Preferably, the temperature during the curing process does not exceed about 150° C. A sol-gel 20 prepared and cured according to the process outlined above will have a glass transition temperature well in excess of 150° C.

Small interstitial cavities 24 are located between the optical fibers 12. After the sol-gel 20 has cured, the interstitial cavities 24 between the optical fibers 12 are preferably filled with an organic coating, such as an epoxy 26. The primary purpose for the use of epoxy 26 is to prevent ingress of moisture and/or contaminants into the interstitial cavities 24. Such ingress could cause, among other things, corrosion of the sol-gel chemical bonds under severe environment. Due to the very small size of the interstitial cavities 24 (typically about 30 microns in diameter) the epoxy 26 must be wicked into the interstitial cavities 24, then heat-treated and subjected to a vacuum to remove trapped air.

After the epoxy 26 has cured, the faces 13 of the optical fibers are preferably ground and/or polished to provide a clean, smooth contact surface for bonding with other optical devices, such as a waveguide, for example.

While the preferred embodiment of the invention has been described in detail, this invention is not limited to the specific embodiment described above, which should be considered as merely exemplary. Further modifications and extensions of the present invention may be developed based upon the foregoing, and all such modifications are deemed to be within the scope of the present invention.

What is claimed is:

1. A fiber optic assembly comprising:
   an alignment plate having at least one alignment hole formed thereon having a first diameter and a perimeter;
   at least one optical fiber having a second diameter, the first diameter being smaller than the second diameter, each of the at least one optical fiber being inserted into a respective one of the at least one alignment hole; and
   a bondline formed between each of the at least one optical fiber and the respective one of the at least one alignment hole, the bondline comprising an inorganic adhesive having a glass transition temperature of at least about 150° C.

2. The assembly of claim 1, wherein the inorganic adhesive is a sol-gel.

3. The assembly of claim 2, wherein the adhesive is sodium silicate.

4. The assembly of claim 3, wherein the sol-gel is about 14% NaOH and about 27% $SiO_2$.

5. The assembly of claim 1, wherein the first diameter is about 1% larger than the second diameter.

6. The assembly of claim 1, wherein the alignment plate further comprises a face and the at least one optical fiber is oriental orthogonally with respect to the face of the alignment plate.

7. The assembly of claim 1, wherein the at least one optical fiber comprises at least three adjacent optical fibers and an interstitial cavity is located between the at least three adjacent optical fibers, the interstitial cavity being filled with an organic coating.

8. The assembly of claim 7, wherein the organic coating comprises an epoxy.

9. The assembly of claim 1, wherein the bondline is less than about 200 nm in thickness.

10. A fiber optic assembly comprising:
    an alignment plate having at least one alignment hole formed thereon having a first diameter and a perimeter; and
    at least one optical fiber having a second diameter, the first diameter being smaller than the second diameter, each of the at least one optical fiber being inserted into a respective one of the at least one alignment hole, each of the at least one optical fiber being bonded to a respective one of the at least one alignment hole along a bondline;
    wherein the bondline is less than about 200 nm in thickness and comprises a sol-gel having a glass transition temperature of at least about 150° C.

11. The assembly of claim 10, wherein the sol-gel is sodium silicate.

12. The assembly of claim 11, wherein the sol-gel is about 14% NaOH and about 27% $SiO_2$.

13. A fiber optic assembly comprising:
    a plurality of optical fibers bonded to a plurality of holes formed in an alignment plate along a plurality of bondlines by an inorganic adhesive, the bondlines corresponding to lines of contact between each of the plurality of optical fibers and a respective one of the plurality of holes formed in the alignment plate, wherein the inorganic adhesive is formed from a colloidal suspension of sodium silicate.

14. The assembly of claim 13, wherein the colloidal suspension of sodium silicate comprises about 14% NaOH and about 27% $SiO_2$.

15. The assembly of claim 14, wherein the bondline is less than about 200 nm in thickness.

* * * * *

UNITED STATES PATENT AND TRADEMARK OFFICE
CERTIFICATE OF CORRECTION

PATENT NO. : 6,757,464 B2
DATED : June 29, 2004
INVENTOR(S) : Robert A. Rubino, Jr.

It is certified that error appears in the above-identified patent and that said Letters Patent is hereby corrected as shown below:

Title page,
Item [54], Title, after the word "AS", insert -- AN --.

Column 4,
Line 16, delete "oriental" and insert therefor -- oriented --.

Signed and Sealed this

Thirtieth Day of November, 2004

JON W. DUDAS
*Director of the United States Patent and Trademark Office*